Oct. 28, 1947.  C. L. STANCLIFF  2,429,778
SELF-LOCKING INSERT
Filed Nov. 28, 1944  2 Sheets-Sheet 1
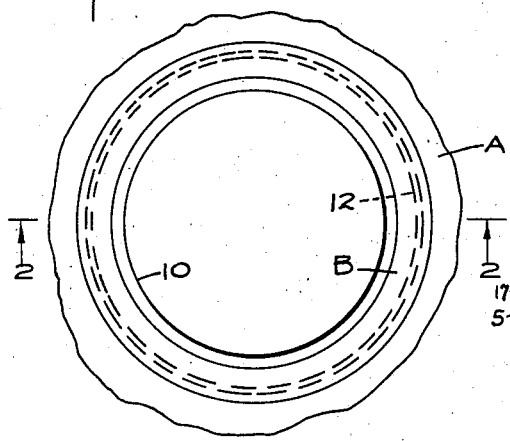
FIG. 1
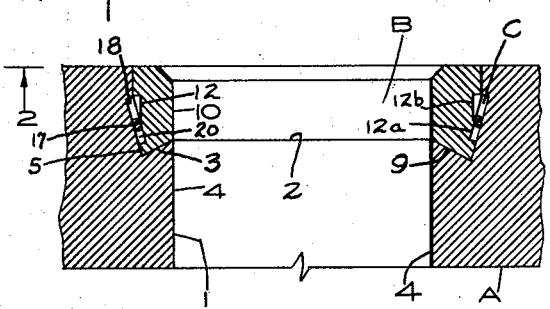
FIG. 2
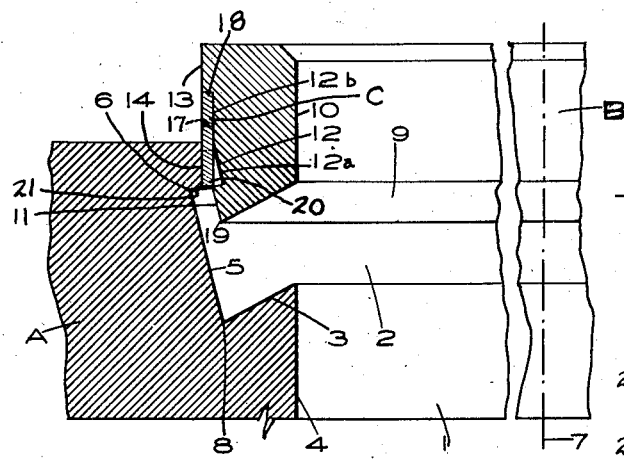
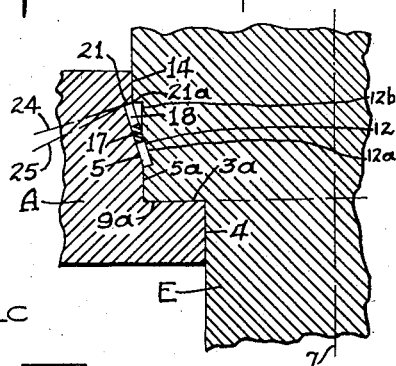
FIG. 3  FIG. 11.
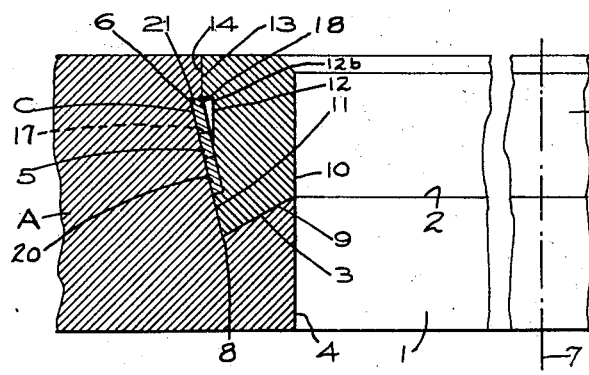
FIG. 4
INVENTOR.
CLIFTON L. STANCLIFF
BY
Munn, Liddy & Glaccum
ATTORNEYS Oct. 28, 1947.  C. L. STANCLIFF  2,429,778
SELF-LOCKING INSERT
Filed Nov. 28, 1944   2 Sheets-Sheet 2

INVENTOR.
CLIFTON L. STANCLIFF
BY
Munn, Liddy & Glaccum
ATTORNEYS

Patented Oct. 28, 1947

2,429,778

UNITED STATES PATENT OFFICE 2,429,778

SELF-LOCKING INSERT

Clifton L. Stancliff, Bakersfield, Calif.

Application November 28, 1944, Serial No. 565,511

11 Claims. (Cl. 251—167)

1

The present invention relates to improvements in a self-locking insert, and it consists of the combinations, constructions and arrangements hereinafter described and claimed.

An object of my invention is to provide a self-locking insert, which is an improvement over the Valve seat patent issued to me on July 11, 1939, No. 2,165,311. In the patent I show the valve seat as being locked in place and maintaining a tight seal as the temperature of the seat increases.

In the present invention I show a self-locking insert which may be used as a valve seat or for other purposes. The device is extremely simple in construction and may be applied to any material where a valve-seat or an insert of a different material is desired. The insert will bind in the recess tightly regardless of temperature increases. In the patent the valve-seat is preferably made of tungsten material known as "Stellite." In the present invention the self-locking insert may be made of tungsten or other type of material.

In a modified form of the invention the self-locking means comprises a plurality of parallelly arranged members secured to a paper backing. The paper backing is stripped off from the members during the insertion of the device in the engine block or other piece of material.

Other objects and advantages will appear in the following specification, and the novel features of the device will be particularly pointed out in the appended claims.

My invention is illustrated in the accompanying drawing forming a part of this application, in which:

Figure 1 is a plan view of the device showing it applied to an engine block or the like;

Figure 2 is a transverse section taken along the line 2—2 of Figure 1;

Figure 3 is an enlarged sectional view showing the self-locking insert being moved into position;

Figure 4 is a view similar to Figure 3 but shows the insert in place;

Figure 5:
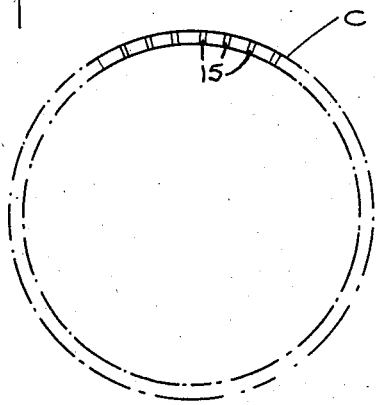
Figure 5 is a plan view of the self-locking member.

2 means is used to secure the insert in place; and

Figure 11 shows a slight modification of insert used.

While I have shown only the preferred forms of my invention it should be understood that various changes or modifications may be made within the scope of the appended claims without departing from the spirit and scope of the invention.

In carrying out my invention I make use of a body member indicated generally at A and this body has a bore 1 therein which may be the bore of a cylinder or the like. The body A has an annular recess 2 formed therein and communicating with the bore 1. It will be noted that the lower shoulder 3 of the recess extends at an acute angle with respect to the cylindrical wall 4 of the bore 1 and that the wall 5 of the recess is inclined so that its upper corner 6 is placed farther away from the bore axis 7 than the lower corner 8.

The insert B is of the shape shown in Figure 3 and has an annular ring with a lower wall 9 extending at the same angle as the recess wall or shoulder 3. The inner wall 10 of the ring is of the same diameter as the bore wall 4. The insert has an outer wall 11 extending at the same angle as the wall 5.

Figure 3 shows the outer wall 11 as having an annular groove 12 with a lower portion 12a extending at the same angle as the wall 11 and an upper portion 12b having a surface paralleling the axis 7. The insert has an outer upper surface 13 that lies parallel with the axis 7 and has a greater radius than the wall 4. The body A has a cylindrical surface 14 having a radius equal to the radius of the surface 13.

Figure 6:
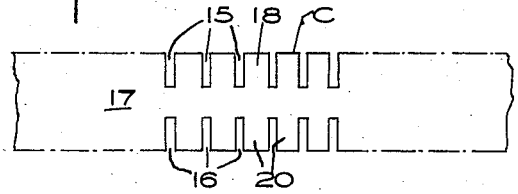
Figure 6 is a side elevation of a portion of Figure 5.
Figure 7:
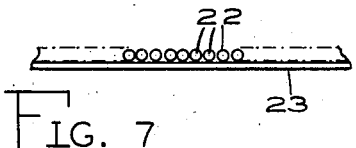
Figure 7 is a top plan view of a modified form of self-locking means used with the insert.
Figure 8:
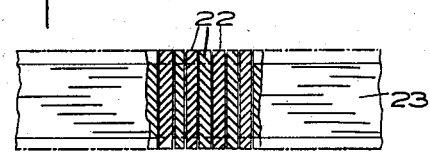
Figure 8 is a front elevation of Figure 7, a portion of the paper being broken away to show the pins.

A self-locking means shown in Figures 5 and 6 and indicated generally at C is used for securing the insert to the body. This means comprises a ring-shaped member made of metal and having a series of slots or notches 15 in its upper surface and a like series of slots or notches 16 in its lower surface. The notches 15 are aligned with the notches 16 and are spaced from each other at their inner edges to provide a connecting band 17. The self-locking means C may be slipped over the lower wall 11 so that the projections 18 will enter the upper portion 12b of the groove 12. It will be noted that the corner 19 formed by the wall 11 and the groove 12 has a radius substantially equal to the radius of the inner surface of the member C, see Figure 3. This permits the device to be readily slipped onto the ring or insert B.

The insert B with the self-locking means C is now moved down into the cylindrical surface 14 and the lower projections 20 will contact with the surface 14. A further downward movement of the insert C will cause the lower rod-like projections 20 to contact with the inclined wall 5 and to be forced into the lower portion 12a of the groove. This will flex the lower rod portions 20 inwardly and will tend to swing the upper rod portions 18 outwardly. As soon as the upper portions 18 pass the shoulder 21 formed at the top of the wall 5, see Figure 4, the upper rod portions 18 will snap under the shoulder 21 and will contact with the top of the wall 5. The peripheral surface of the groove 12 has two inclined portions that make the surface convex in cross section. This convex surface permits the rod-like projections to swing in the manner disclosed.

When the insert is seated, the self-locking means C will hold the wall 9 of the insert in contact with the wall 3 of the recess and the wall 11 of the insert will contact with the wall 5 of the body. The walls 13 and 14 will likewise contact with each other. The insert cannot be removed when the rod-like portions 18 once engage with the shoulder 21. The insert B will expand greater than the body A when the temperature is increased. The greater amount of expansion will take place in a direction radially of the insert and the lesser amount of expansion will take place in a direction axially of the insert. The face 9 will be forced against the face 3 during this movement to make a tight fit. It is to be understood that the original fit of the insert in the body is such that when the parts are cold there will be sufficient clearance for the insert to expand tightly against the body without being constricted or crushed. Thus the insert will not become warped or distorted from excessive pressure against the body and will remain tightly in place irrespective of temperature changes. The member C prevents the insert from moving upwardly during its expansion from heat. The angle of the faces 3 and 9 cause the insert to bind tightly in the recess regardless of the temperature changes.

Figure 9:
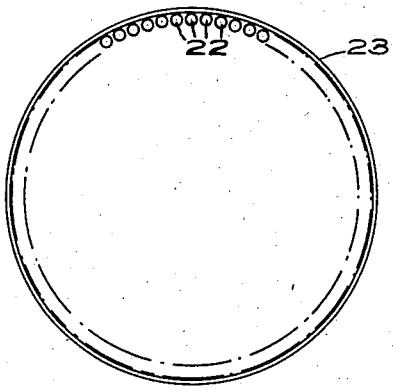
Figure 9 shows the paper and pins arranged in a circle.

A modified form of the invention is shown in Figures 7 to 10 inclusive. Here the self-locking means D differs slightly from the means shown at C and the rest of the apparatus is the same as that already described and therefore corresponding reference numerals will be applied to similar parts. Pins 22 are arranged parallel to one another and are glued to a paper 23. The paper may be arranged in a circular manner as shown in Figure 9 and will dispose the pins 22 on its inner surface.

Figure 10:
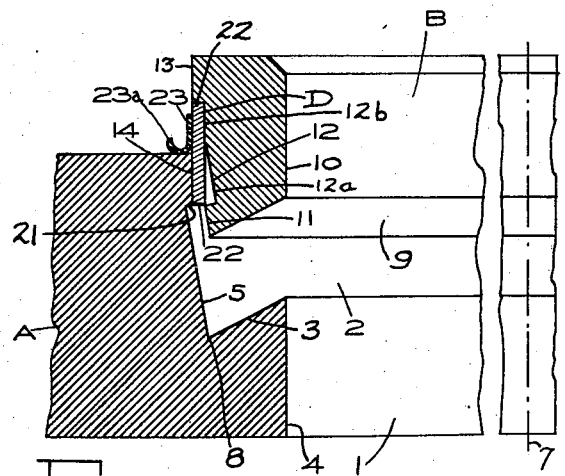
Figure 10 illustrates how the self-locking

In assembling the insert B to the body A, in Figure 10, the pins 22 with the paper 23 are placed in the groove 12 and the insert is forced into the bore 14. The upper edge of the wall 14 will peel the paper from the pins, as shown at 23a but the pins will be moved on down into the recess 2 and will snap into place in the same manner as shown in Figure 4. The result will be the same as that shown in the preferred form in that the pins will hold the insert against accidental removal.

The shoulder 21 in the body A does not extend at right angles to the wall 5. Figure 11 shows a broken line 24 that does extend at right angles to the wall 5 and shows a second broken line 25 extending at an angle to the line 24 and starting at the corner 21a of the shoulder. The shoulder 21 coincides with the second line 25 and therefore the recess wall 5 will have less height than the entrance to the recess. The pins or projections 18 will be wedged in place as the upper ends are forced against the inclined shoulder 21. A tighter connection between the body A and the insert B is the result. The construction of the shoulder 21 in Figure 11 is the same as that illustrated in Figures 3 and 4.

The insert B need not be a ring with a valve seat formed therein. Figure 11 shows a solid insert E that has a reduced portion received in the bore wall 4 and an enlarged portion received in the bore wall 5a. The wall 5a is cylindrical and parallels the wall 14 but is of less diameter. It will further be noted that the wall 3a extends at right angles to the center line 7 and that the wall 9a of the insert E extends at right angles to the wall 5a and abuts the wall 3a when the insert E is in position. The insert E is held tightly in place by the projections 18 wedging against the shoulder 21 that makes an obtuse angle with the wall 5.

In the form shown in Figure 3, the shrinkage of the insert is ten times in the direction of the diameter to one in the direction of the axis 7. The angle of the shoulder 21 to the wall 3 causes the insert wall 9 and the body wall 3 to bind together. In Figure 11, the walls 5a and 3a make a 90° angle, but the wedging of the projections 18 against the shoulder 21 makes a tight fit even though the insert shrinks with respect to the body due to temperature changes. The wall 5a can parallel the wall 14 if desired, as shown in Figure 11.

The angle that the shoulder 21 makes with the wall 3 varies according to the shrinkage ratio between the outside diameter and the thickness of the insert. The ratio is ten to one when the outside diameter is two inches and the thickness three-eighths of an inch. Should the outside diameter be increased to six inches and the thickness of the insert remain the same, the ratio would be thirty to one instead of ten to one. The angle formed between the shoulder 21 and the wall 3 would be less pronounced for this increased ratio. This angle causes the insert to remain tight as the insert contracts or expands due to temperature changes.

The shoulder 21 always makes an obtuse angle with the wall 5 in the form of the device shown in Figure 11 and also in the forms shown in Figures 2, 3, 4 and 10. In other words the shoulder 21 makes an obtuse angle with the wall 5 whether the wall 3a makes a right angle with the axis 7 or whether the wall 3 makes an angle other than a right angle with the axis 7.

I claim:

1. The combination with a body having a bore therein and an annular recess communicating with the bore and having an inclined peripheral wall with a shoulder at its top, of an insert for the recess having an annular groove with an inner wall convex in cross section, the lower wall portion paralleling the inclined recess wall and the upper wall portion paralleling the bore axis, a plurality of self-locking pins, means interconnecting the pins for holding them in parallel relation in the groove, the lower ends of the pins contacting with the inclined recess wall for flexing the pins as the insert is moved into the recess, whereby the tops of the pins will snap under the shoulder when the insert is seated and prevent the withdrawal of the insert, the bottom of the insert and the adjacent wall of the recess being inclined with respect to the bore axis so that an expansion of the insert from heat will cause the two abutting surfaces to bind more tightly.

2. The combination with a body having a bore and an annular recess communicating with the bore, the body having an entrance opening communicating with the recess and being concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the outer periphery of the insert having an annular groove with a peripheral wall convex in cross section, the upper portion of the groove wall paralleling the entrance opening wall and the lower portion paralleling the conical recess wall, the portion of the insert peripheral wall disposed below the groove being inclined and adapted to contact the inclined recess wall when the insert is seated, a self-locking ring-shaped member received in the insert groove and movable into the recess with the insert, said member having longitudinally extending and parallely arranged slots extending inwardly from opposite ends to define aligned projections which are flexed by contacting the conical recess wall as the insert is moved into seating position, the flexing causing the ends of the projections disposed nearest to the entrance opening to snap under the shoulder when the insert is seated, whereby the insert is locked in place, the recess having a bottom wall for limiting the inward movement of the insert into the recess.

3. The combination with a body having a bore and an annular recess communicating with the bore, the body having an entrance opening communicating with the recess and being concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the outer periphery of the insert having an annular groove with a peripheral wall convex in cross section, the upper portion of the groove wall paralleling the entrance opening wall and the lower portion paralleling the conical recess wall, the portion of the insert peripheral wall disposed below the groove being inclined and adapted to contact the inclined recess wall when the insert is seated, a self-locking ring-shaped member received in the insert groove and movable into the recess with the insert, said member having longitudinally extending and parallely arranged slots extending inwardly from opposite ends to define aligned projections which are flexed by contacting the conical recess wall as the insert is moved into seating position, the flexing causing the ends of the projections disposed nearest to the entrance opening to snap under the shoulder when the insert is seated, whereby the insert is locked in place, the recess having a bottom wall for limiting the inward movement of the insert into the recess, the bottom recess wall being inclined for making an obtuse angle with the bore axis, said insert having a bottom wall similarly inclined and adapted to contact with the recess bottom wall when the insert is locked in place, the insert bottom wall making a tighter binding contact with the bottom recess wall when the temperature is increased.

4. The combination with a body having a bore and an annular recess communicating with the bore, the body having an entrance opening communicating with the recess and being concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the outer periphery of the insert having an annular groove with a peripheral wall convex in cross section, the upper portion of the groove wall paralleling the entrance opening wall and the lower portion paralleling the conical recess wall, the portion of the insert peripheral wall disposed below the groove being inclined and adapted to contact the inclined recess wall when the insert is seated, a self-locking member having parallel pins held in place by a flexible ring, said member being received in the insert groove and movable into the recess with the insert, said ring being torn from the pins by contacting with the entrance opening wall and said pins being flexed by contacting with the conical recess wall as the insert is moved into seating position, the flexing causing the pins to snap under the shoulders when the insert is seated, whereby the insert is locked in place, the recess having a bottom wall for limiting the inward movement of the insert into the recess.

5. The combination with a body having a bore and an annular recess communicating with the bore, the body having an entrance opening communicating with the recess and being concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the outer periphery of the insert having an annular groove with a peripheral wall convex in cross section, the upper portion of the groove wall paralleling the entrance opening wall and the lower portion paralleling the conical recess wall, the portion of the insert peripheral wall disposed below the groove being inclined and adapted to contact the inclined recess wall when the insert is seated, a self-locking member received in the insert groove and movable into the recess with the insert, said member being ring-shaped and having longitudinally and inwardly extending slots from both ends of the ring to form upper and lower rows of projections interconnected by a central band, the lower row of projections being flexed by contacting with the conical recess wall as the insert is moved into seating position, the flexing causing the upper row of projections to snap under the shoulder when the insert is seated, whereby the insert is locked in place, the recess having a bottom wall for limting the inward movement of the insert into the recess.

6. The combination with a body having a bore and an annular recess communicating with the bore, the body having an entrance opening communicating with the recess and concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the insert outer periphery having an annular groove with a peripheral wall convex in cross section, the upper portion of the groove wall paralleling the entrance opening wall and being of a smaller diameter, and the lower portion of the groove wall paralleling the conical recess wall and being of a smaller diameter, the portion of the insert peripheral wall disposed below the groove being inclined and adapted to contact the inclined recess wall when the insert is seated, a self-locking ring-shaped member having longitudinal slots extending inwardly from both ends of the member to form upper and lower rows of projections interconnected by a central band, the upper row of projections being received in the space provided at the top of the insert groove, the lower row of projections being flexed inwardly by contacting with the conical recess wall as the insert is moved into seating position, the flexing causing the upper projections to snap under the shoulder for locking the insert in place.

7. The combination with a body having a bore and an annular recess communicating with the bore, the body having an entrance opening communicating with the recess and concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the insert outer periphery having an annular groove with a peripheral wall convex in cross section, the upper portion of the groove wall paralleling the entrance opening wall and being of a smaller diameter, and the lower portion of the groove wall paralleling the conical recess wall and being of a smaller diameter, the portion of the insert peripheral wall disposed below the groove being inclined and adapted to contact the inclined recess wall when the insert is seated, a self-locking ring-shaped member having longitudinal slots extending inwardly from both ends of the member to form upper and lower rows of projections interconnected by a central band, the upper row of projections being received in the space provided at the top of the insert groove, the lower row of projections being flexed inwardly by contacting with the conical recess wall as the insert is moved into seating position, the flexing causing the upper projections to snap under the shoulder for locking the insert in place, said insert having a bottom wall and the recess having a cooperating wall adapted to make a tight contact when the insert is seated.

8. The combination with a body having a bore and an annular recess communicating with the bore, the body having an entrance opening communicating with the recess and concentric with the bore, said entrance opening being of a larger diameter than the bore, said recess having an inclined peripheral wall with the diameter of the wall portion disposed nearest the entrance opening being larger than the entrance opening diameter for providing a shoulder, of an insert having an outer diameter equal to the entrance opening diameter, the insert outer periphery having an annular groove with a peripheral wall convex in cross section, the upper portion of the groove wall paralleling the entrance opening wall and being of a smaller diameter, and the lower portion of the groove wall paralleling the conical recess wall and being of a smaller diameter, the portion of the insert peripheral wall disposed below the groove being inclined and adapted to contact the inclined recess wall when the insert is seated, a self-locking ring-shaped member having longitudinal slots extending inwardly from both ends of the member to form upper and lower rows of projections interconnected by a central band, the upper row of projections being received in the space provided at the top of the insert groove, the lower row of projections being flexed inwardly by contacting with the conical recess wall as the insert is moved into seating position, the flexing causing the upper projections to snap under the shoulder for locking the insert in place, said insert having a bottom wall and the recess having a cooperating wall adapted to make a tight contact when the insert is seated, said last-named contacting wall extending at an acute angle to the conical recess wall for causing the walls to remain in tight contact regardless of temperature changes.

9. The combination with a body having a shouldered bore therein and an annular recess communicating with the bore at a spaced distance above the shoulder, the shoulder extending at right angles to the bore axis, of an insert for the recess and having a shoulder for contacting with said first-named shoulder, said insert having an annular recess, said first and second-named recesses having opposed shoulders, self-locking means engageable with the recess shoulders for securing the insert in place, said first-named recess shoulder making an obtuse angle with the circular wall of the same recess, whereby said self-locking means is wedged against the first-named recess shoulder for securing the insert tightly in position.

10. The combination with a body having a bore therein and an annular recess communicating with the bore, of a circular insert for the recess, the recess having an end face for contacting with a face on the insert for limiting the inward movement of the insert into the recess, the peripheral wall of the recess having an annular groove whose side furthest removed from the recess end face forms a shoulder facing the recess end face, the insert having an annular groove in its periphery registering with the first-named groove when the insert is in place, the inner wall of the second annular groove having a circumferential portion paralleling the inner wall of the first annular groove, said circumferential portion defining a shoulder opposing the first-named shoulder, the remaining circumferential portion of the inner second annular groove wall paralleling the outer periphery of the insert, and a plurality of longitudinally extending and parallelly arranged locking members initially receivable in the insert annular groove and being swingable by contact with the recess annular groove inner wall when the insert is moved into the recess, for swinging the members so that their ends contact the opposed shoulders, the inner wall of the recess annular groove and the first-mentioned circumferential portion of the inner wall of the insert annular wall contacting with opposite sides of the members for holding them in a position where the ends of the members will continue to contact with the opposed shoulders and retain the insert tightly in the recess.

11. The combination with a body having a bore therein and a recess communicating with the bore and having an annular shoulder and groove in its peripheral wall, the bore and recess forming a shoulder, an insert adapted to enter the recess and rest against the second-named shoulder, said insert having an annular groove facing the first groove and a shoulder opposed to the first shoulder, the first shoulder making an obtuse angle with the wall of its groove, and a locking member having its ends abutting against the first and third mentioned shoulders for holding the insert in place, the insert groove peripheral wall being convex in cross section with the peripheral portion disposed nearest the insert shoulder holding the locking member against the wall of the recessed groove, whereby the opposite end of the locking member is held against the first shoulder, the insert groove providing a space for temporarily receiving said opposite locking member end during the insertion of the insert into the recess, the convex groove wall of the insert creating a flexing tension on the locking member for causing the said opposite end thereof to snap under the first shoulder as soon as the shoulder is cleared by the seating of the insert against the second-named shoulder.

CLIFTON L. STANCLIFF.

REFERENCES CITED

The following references are of record in the file of this patent:

UNITED STATES PATENTS

| Number | Name | Date |
| --- | --- | --- |
| 452,357 | Bavier | May 19, 1891 |
| 573,518 | Mayes | Dec. 22, 1896 |
| 744,504 | Dieringer | Nov. 17, 1903 |
| 921,809 | Davis | May 18, 1909 |
| 1,891,460 | Vlahek | Dec. 20, 1932 |
| 1,978,340 | Clement | Oct. 23, 1934 |
| 2,114,934 | Nordstrom | Apr. 19, 1938 |
| 2,238,706 | Ohls | Apr. 15, 1941 |